United States Patent
Seyama et al.

(10) Patent No.: US 11,509,126 B2
(45) Date of Patent: Nov. 22, 2022

(54) WIRING STRUCTURE WITH MOVEMENT MECHANISM

(71) Applicant: SHINKAWA LTD., Tokyo (JP)

(72) Inventors: Kohei Seyama, Tokyo (JP); Tetsuya Utano, Tokyo (JP)

(73) Assignee: SHINKAWA LTD., Tokyo (JP)

( * ) Notice: Subject to any disclaimer, the term of this patent is extended or adjusted under 35 U.S.C. 154(b) by 763 days.

(21) Appl. No.: 16/622,292

(22) PCT Filed: Feb. 1, 2018

(86) PCT No.: PCT/JP2018/003472
§ 371 (c)(1),
(2) Date: Mar. 13, 2020

(87) PCT Pub. No.: WO2018/143367
PCT Pub. Date: Aug. 9, 2018

(65) Prior Publication Data
US 2020/0339375 A1    Oct. 29, 2020

(30) Foreign Application Priority Data
Feb. 3, 2017 (JP) ............................. JP2017-018864

(51) Int. Cl.
*H02G 15/007* (2006.01)
*B65H 51/20* (2006.01)
(Continued)

(52) U.S. Cl.
CPC ........... *H02G 15/007* (2013.01); *B65H 51/20* (2013.01); *B65H 57/14* (2013.01); *B65H 59/36* (2013.01);
(Continued)

(58) Field of Classification Search
CPC .... H02G 15/007; H02G 15/06; H02G 11/003; B65H 51/20; B65H 57/14; B65H 59/36;
(Continued)

(56) References Cited

U.S. PATENT DOCUMENTS 4,114,273 A * 9/1978 McGaha ................. A61G 15/16
242/385.1
5,025,600 A * 6/1991 Sugimoto ................. E04B 1/98
248/588
(Continued)

FOREIGN PATENT DOCUMENTS

JP    H04140276    5/1992
JP    H0813948     1/1996
(Continued)

OTHER PUBLICATIONS

"International Search Report (Form PCT/ISA/210) of PCT/JP2018/003472," dated Apr. 3, 2018, with English translation thereof, pp. 1-4.

*Primary Examiner* — Harshad C Patel
(74) *Attorney, Agent, or Firm* — JCIPRNET

(57) ABSTRACT

A wiring structure (10) includes: a fixed member (14); a movable member (12) which moves rectilinearly with respect to the fixed member (14); a wire material (16) which connects the movable member (12) and the fixed member (14); a movable guide (18) over which the wire material (16) is stretched and which can move rectilinearly with respect to the fixed member (14); and a movement mechanism (20) which causes the movable guide (18) to move, in conjunction with the rectilinear movement of the movable member (12), rectilinearly in a direction in which the loosening or tightening of the wire material (16) caused by the rectilinear movement of the movable member (12) is offset.

7 Claims, 6 Drawing Sheets

(51) Int. Cl.
  *B65H 57/14*  (2006.01)
  *B65H 59/36*  (2006.01)
  *H02G 11/00*  (2006.01)
(52) U.S. Cl.
  CPC ....... *H02G 11/003* (2013.01); *B65H 2701/36* (2013.01)
(58) Field of Classification Search
  CPC ...... B65H 59/38; B65H 59/34; B65H 59/005; B65H 59/00; B65H 2702/36
  USPC ...................................................... 191/12 R
  See application file for complete search history.

(56) References Cited

U.S. PATENT DOCUMENTS

| | | | | |
|---|---|---|---|---|
| 5,897,791 | A * | 4/1999 | Hayakawa | B23H 7/02 219/69.11 |
| 6,210,530 | B1 * | 4/2001 | Loser | D21F 3/045 162/358.3 |
| 9,523,173 | B1 * | 12/2016 | Tonello | D21F 3/04 |
| 10,280,562 | B2 * | 5/2019 | Kotilainen | D21F 3/04 |
| 2007/0028481 | A1 * | 2/2007 | Gronych | D21F 3/045 162/358.3 |

FOREIGN PATENT DOCUMENTS

| | | |
|---|---|---|
| JP | 2010011283 | 1/2010 |
| JP | 2010110180 | 5/2010 |

* cited by examiner

WIRING STRUCTURE WITH MOVEMENT MECHANISM

CROSS-REFERENCE TO RELATED APPLICATION

This application is a 371 application of the International PCT application serial no. PCT/JP2018/003472, filed on Feb. 1, 2018, which claims the priority benefits of Japan Patent Application No. 2017-018864, filed on Feb. 3, 2017. The entirety of each of the above-mentioned patent applications is hereby incorporated by reference herein and made a part of this specification.

BACKGROUND OF THE INVENTION

Technical Field

The present specification discloses a wiring structure for wiring a wire material which connects a fixed member and a movable member moving rectilinearly with respect to the fixed member without loosening and disconnection.

Related Art

In various processing devices, a predetermined operation is performed with a movable member while the movable member is moved to an arbitrary direction in many cases. Various elements such as a motor, a solenoid, a camera, a light source, a suction member, and the like are assembled to the movable member to enable the predetermined operation. Wire materials such as a power supply cable, a signal cable, an optical cable, an air cable, and the like are connected to these elements. The other ends of these wire materials are connected to fixed members such as a power supply device, a signal processing device, an air pump, and the like. When the wire material that connects the movable member and the fixed member is loosened in the middle, noise may be generated due to fluttering, or the wire material may interfere with other members and inhibit normal driving of the equipment. On the other hand, if the wire material is pulled excessively, the wire is disconnected, which also inhibits the normal driving of the equipment.

Therefore, conventionally, a number of techniques for holding a wire material connected to a movable member without loosening or disconnection have been proposed. For example, Cableveyor (registered trademark) is widely known as a mechanism for holding a wire material connected to a movable member without loosening or disconnection of the wire material. Cableveyor is formed by linking, in the longitudinal direction, a plurality of piece members through which the wire material can pass, and thus can hold the wire material without loosening or disconnection of the wire material by changing the bending position or the curvature of Cableveyor along with the movement of the movable member.

LITERATURE OF RELATED ART

Patent Literature

Patent literature 1: Japanese Patent No. 3250030
Patent literature 2: Japanese Patent No. 5406231

SUMMARY

Problems to be Solved

However, when Cableveyor is used, a wire material is surrounded by Cableveyor several times thicker than the wire material and thereby a large space is required for wiring. In addition, there is a limit on the length of the wire material that can be held by Cableveyor without loosening, and if the length exceeds a certain value, even when Cableveyor is used, the wire and Cableveyor are loosened. Furthermore, Cableveyor changes the bending position or the curvature by causing the linked piece members to move with respect to each other, and thus there is also a problem that noise generated due to collision between the piece members is large.

Therefore, a wiring structure not using Cableveyor has been proposed in some cases. For example, in patent literature 1, a wiring structure is disclosed in which a probe cable (wire material) connecting an ultrasonic device (fixed member) and a probe (movable member) is caused to pass through a ring portion which is movable along a rail. However, patent literature 1 is used for disconnection prevention of the probe cable, and cannot prevent loosening of the probe cable.

In patent literature 2, a wiring mechanism is disclosed which includes a wiring (wire material) stretched between a movable-side wiring holding portion (movable member) and a base-side wiring holding portion (fixed member), and a locking portion that locks a part of the wiring; and the locking portion is arranged on a link mechanism whose posture changes along with the movement of the movable-side wiring holding portion.

According to the wiring mechanism, since Cableveyor is unnecessary, problems such as an increase in space or noise can be reduced. However, in the mechanism of patent literature 2, the path of the wiring changes so as to follow the posture change of the link mechanism. Therefore, when the bending angle of a part of the link mechanism becomes steep along with the posture change of the link mechanism, the bending angle of the wiring also becomes steep, and a load is applied to the wiring. In addition, in the mechanism of patent literature 2, it is necessary to leave an appropriate margin for wiring in order to appropriately move the link mechanism, and it is difficult to sufficiently eliminate loosening of the wiring.

Therefore, in the specification, a wiring structure is disclosed which is capable of holding a wire that connects a movable member and a fixed member without using Cableveyor in the state of maintaining an appropriate tension.

Means to Solve Problems

The wiring structure disclosed in the specification includes: a fixed member; a movable member which moves rectilinearly with respect to the fixed member; a wire material which connects the movable member and the fixed member; a movable guide over which the wire material is stretched, and which can move rectilinearly with respect to the fixed member; and a movement mechanism which causes the movable guide to move, in conjunction with the rectilinear movement of the movable member, rectilinearly in a direction in which the loosening or tightening of the wire material caused by the rectilinear movement of the movable member is offset.

With this configuration, the movable guide moves rectilinearly in the direction in which the loosening or tightening of the wire material caused by the rectilinear movement of the movable member is offset, and thus the wire material can be held without using Cableveyor in the state of maintaining an appropriate tension.

In movable guides may be arranged in the middle of the path of one wire material; the wire material may be stretched to make a U-turn of 180 degrees in each movable guide; and the movement mechanism may cause each movable guide to move rectilinearly by $1/(2\times n)$ times of the movement amount of the movable member in conjunction with the rectilinear movement of the movable member.

By causing the wire material to make a U-turn of 180 degrees, the curvature of the wire does not change and the load on the wire material can be kept constant even if the movable guide moves rectilinearly. In addition, since the movement amounts of the movable member and the movable guide can be set in a proportional relationship, the movement of the movable guide is easily controlled.

In this case, the movable member may move rectilinearly in a first direction; one movable guide may be arranged in the middle of the path of one wire material; after extending in the first direction from the movable member, the wire material may be stretched over the movable guide, make a U-turn of 180 degrees, and extend to the fixed member; and the movement mechanism may cause the movable guide to move in the same direction as the movement direction of the movable member by one half of the movement amount of the movable member in conjunction with the rectilinear movement of the movable member.

With this configuration, the movement direction of the movable member and the movement direction of the movable guide become the same, and thus the movement of the movable guide is more easily controlled.

Furthermore, the wiring structure may include one or more fixed guides which are arranged at a fixed position in the middle of the path of the wire material and which bend the path of the wire material by stretching of the wire material.

With this configuration, the wiring path of the wire material can be freely designed, and the degree of freedom in the wiring design is further improved.

In addition, the movement mechanism may include a follower mechanism which causes the movable guide to follow the movable member or another movable guide.

In this case, the wiring structure may include a first wire material extending from one end of the movable member, and a second wire material extending from the other end of the movable member; a first movable guide over which the first wire material is stretched and a second movable guide over which the second wire material is stretched may be arranged on both sides of the movable member; the follower mechanism may include a restraint member which restricts the distance between the first movable guide and the second movable guide. By connecting the first and second movable guides, the two movable guides can be reliably moved in conjunction with the movable member even if a dedicated driving source is not arranged.

In addition, the movement mechanism may cause the movable guide to move with respect to the fixed member with a tension of the wire material. In addition, the movement mechanism may have a driving mechanism which drives the movable guide independently of the movement of the movable member.

In addition, the movement mechanism may include a pulling mechanism which pulls the movable guide in a direction in which the wire material stretched over the movable guide is tightened.

For example, the pulling mechanism may include an elastic body which urges the movable guide in the direction in which the wire material stretched over the movable guide is tightened. In addition, the pulling mechanism may include a weight which is connected to the movable guide, and which pulls, by falling under gravity, the movable guide in the direction in which the wire material stretched over the movable guide is tightened.

In addition, the movement mechanism may include: a first belt unit having a first roller pair and a first endless belt stretched between the first roller pair; a second belt unit having a second roller pair and a second endless belt stretched between the second roller pair; a first frame to which the first belt unit is attached; a second frame to which the second belt unit is attached and which is movable with respect to the first frame; a first link which connects the first frame and the second endless belt; and a second link which connects the second frame and the first endless belt; the movable member may be attached to a surface of the second endless belt, the surface being on the opposite side of a connection point, at which the second link is connected, with the second roller pair located therebetween; and the movable guide may be attached to the second frame and move rectilinearly with the second frame.

With this configuration, both the movable member and the movable guide can be caused to move in conjunction with each other by one motor.

Effect

According to the wiring structure disclosed in the specification, since the movable guide moves rectilinearly in the direction in which the loosening or tightening of the wire material caused by the rectilinear movement of the movable member is offset, the wire material can be held in the state of maintaining an appropriate tension without using Cableveyor.

DESCRIPTION OF THE EMBODIMENTS

Figure 1:
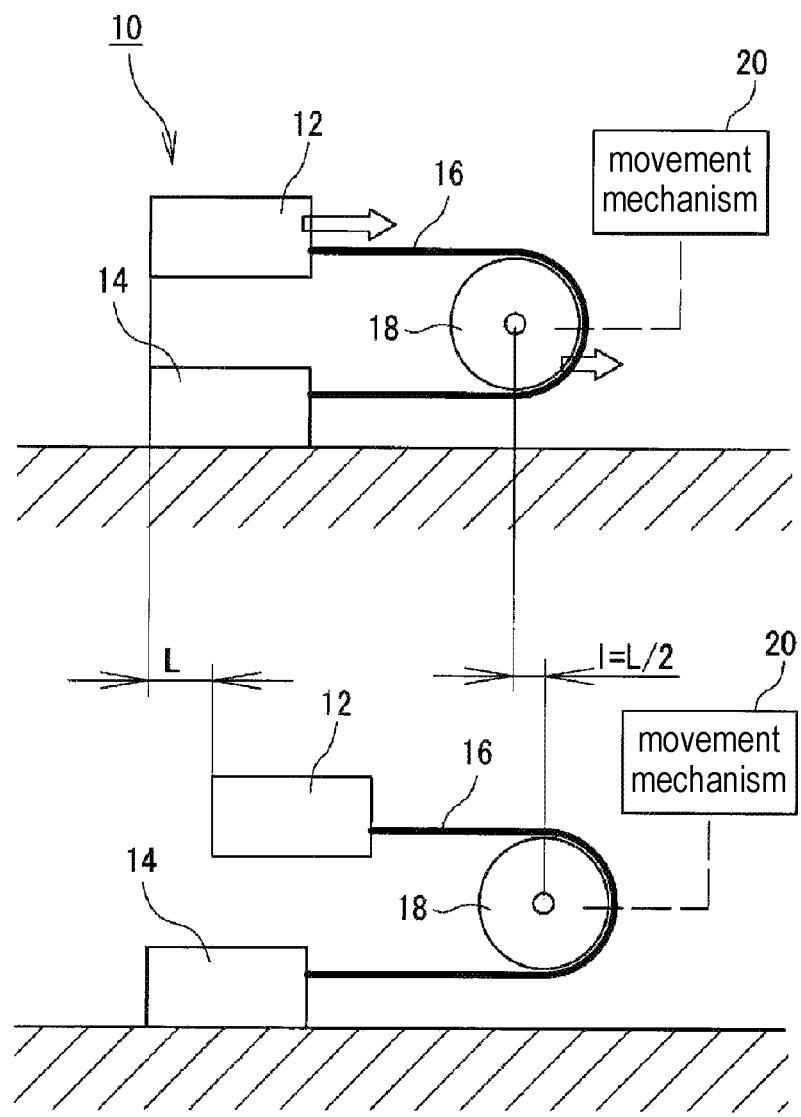
FIG. 1 is a schematic diagram showing a basic wiring structure.

Hereinafter, a wiring structure 10 is described with reference to the drawings. FIG. 1 is a schematic diagram of the basic wiring structure 10. The wiring structure 10 disclosed in the specification is incorporated into various processing devices. The processing device into which the wiring structure 10 is incorporated is not particularly limited as long as this processing device has a fixed member 14, a movable member 12 that moves rectilinearly with respect to the fixed member 14, and a wire material 16 that connects the movable member 12 and the fixed member 14. Accordingly, the wiring structure 10 can be incorporated into the processing devices in various fields such as a semiconductor mounting device having a substrate transfer head that moves rectilinearly, a machine tool having a main shaft capable of three-axis-movement, an assembly device having a processing head that moves rectilinearly to assemble various products, a monitoring device having a camera that moves rectilinearly, and the like.

The wiring structure 10 includes the movable member 12, the fixed member 14, the wire material 16, a movable guide 18, and a movement mechanism 20. The movable member 12 is a member that moves rectilinearly in a prescribed first direction. In the example illustrated in FIG. 1, the movable member 12 moves in the left-right direction on the paper surface. The driving mechanism that causes the movable member 12 to move rectilinearly is not particularly limited and may be, for example, a mechanism that converts the rotation movement of the motor into a rectilinear movement with a power conversion mechanism such as a ball screw or the like and transmits the rectilinear movement to the movable member 12, a mechanism having a direct-moving driving source such as a linear motor, an electromagnetic cylinder or a hydraulic cylinder, and the like. In addition, various elements (not shown) such as a motor, a solenoid, a sensor, a camera, a light source, a lens, a suction member, a discharge nozzle are assembled to the inside or the outside, or both the inside and the outside of the movable member 12. Hereinafter, the element assembled to the movable member 12 is referred to as a "movable side element".

The fixed member 14 is attached in a position-invariant manner. Elements (not shown) that are electrically, mechanically, or optically connected to the movable side element are assembled to the fixed member. Hereinafter, the element assembled to the fixed member 14 is referred to as a "fixed side element". Examples of the fixed element include a power supply device, a signal processing device, a relay connector device, a pump device, and the like.

The wire material 16 connects the movable side element arranged on the movable member 12 and the fixed side element arranged on the fixed member. The wire material 16 is selected corresponding to the characteristics of the corresponding movable side element. Accordingly, examples of the wire material 16 include a power supply cable, a signal cable, an optical cable, an air cable, a liquid hose, and the like. Besides, the wire material 16 has flexibility to a degree that it can be deformed following the movement of the movable member 12 and the movable guide 18. On the other hand, the wire material 16 can hardly expand and contract, and the length thereof is substantially constant. In addition, there may be one or a plurality of wire materials 16. In any case, the wire material 16 extends from the movable member 12 and is stretched over the movable guide 18, and then is connected to the fixed member 14.

The movable guide 18 is a member over which the wire material 16 extending from the movable member 12 to the fixed member 14 is stretched and hooked. The configuration of the movable guide 18 is not particularly limited as long as the stretched wire material 16 can slide on the peripheral surface of the movable guide 18. Accordingly, the movable guide 18 may be a pulley that can rotate around a predetermined axis, a columnar pin or a non-circular pin that cannot rotate, and the like. However, in order to reduce the sliding friction between the movable guide 18 and the wire material 16, the movable guide 18 is desirably a pulley that can rotate, a member in which a plurality of rollers is arranged on the peripheral surface, and the like.

The movable guide 18 can move rectilinearly in conjunction with the movable member 12. Therefore, in the wiring structure 10, for example, a guide rail, a long hole for guide, or the like (not shown) is arranged as a guide member for guiding the rectilinear movement of the movable guide 18. The number, the position, or the size of the movable guide 18 can be appropriately changed corresponding to the path of the wire material 16 as illustrated later. FIG. 1 shows an example in which one movable guide 18 is arranged in the middle of the path of one wire material 16.

The movement mechanism 20 is a mechanism that causes the movable guide 18 to move rectilinearly in conjunction with the rectilinear movement of the movable member 12. The movement mechanism 20 is not particularly limited as long as it can cause the movable guide 18 to move rectilinearly. Accordingly, for example, the movement mechanism 20 may have a motor dedicated to the movement of the movable guide 18, or a transmission mechanism that transmits the motion of the movable member 12 or another movable guide 18 to the movable guide 18. In addition, the movement mechanism 20 may have a mechanism that pulls the movable guide 18 with an elastic restoring force or gravity, or a mechanism that transmits the power of one driving source (for example, a motor) to both the movable member 12 and the movable guide 18. In any case, the movement mechanism 20 causes the movable guide 18 to move rectilinearly so as to offset the loosening or tightening of the wire material 16 caused by the rectilinear movement of the movable member 12.

The above situation is described with reference to FIG. 1 as an example. In the example of FIG. 1, the movable member 12 moves rectilinearly in the left-right direction. In addition, after extending straight toward the right direction from the right end of the movable member 12, the wire material 16 is then stretched (hooked) over the movable guide 18, makes a U-turn of 180 degrees, and is connected to the fixed member 14. In this case, when it is assumed that the movable guide 18 is invariable, the movable member 12 moves rectilinearly in the right direction, and thereby the wire material 16 is loosened. The loosening of the wire material 16 causes fluttering, entanglement, or the like of the wire material 16. On the other hand, when the movable member 12 moves in the left direction, the wire material 16 is pulled by the movable member 12 and becomes tightened. Then, when the wire material 16 is excessively tightened, the wire material 16 is deteriorated or disconnected.

The movement mechanism 20 causes the movable guide 18 to move rectilinearly so as to offset the loosening or tightening of the wire material 16 caused by the rectilinear movement of the movable member 12. Specifically, when the movable member 12 moves rectilinearly in a direction in which the wire material 16 is loosened, the movement mechanism 20 causes the movable guide 18 to move rectilinearly in a direction in which the wire material is tightened. In addition, when the movable member 12 moves rectilinearly in the direction in which the wire material 16 is tightened, the movement mechanism 20 causes the movable guide 18 to move rectilinearly in the direction in which the wire material in loosened. That is, in the example of FIG. 1, the wire material 16 is loosened when the movable member 12 moves in the right direction or when the movable guide 18 moves in the left direction, and the wire material 16 is tightened when the movable member 12 moves in the left direction or when the movable guide 18 moves in the right direction. Accordingly, in the example of FIG. 1, the movement mechanism 20 causes the movable guide 18 to move in the right direction when the movable member 12 moves in the right direction, and causes the movable guide 18 to move in the left direction when the movable member 12 moves in the left direction.

Here, a movement amount I of the movable guide 18 changes corresponding to the number of the movable guide 18 and the U-turn angle of the wire material 16. For example, when the wire material 16 makes a U-turn of 180 degrees in the movable guide 18, there are n movable guides 18, and the movement amount of the movable member 12 is L, the movement amount I of the movable guide 18 is I=L/(2× n). In the example of FIG. 1, since there is only one movable guide 18, the movement mechanism 20 causes the movable guide 18 to move by the movement amount I=L/2 when the movable member 12 moves by the movement amount L.

In other words, in the example of FIG. 1, the movement mechanism 20 causes the movable guide 18 to move rectilinearly in conjunction with the rectilinear movement of the movable member 12 in the same direction as the movable member 12 by one half of the movement amount L of the movable member 12. By causing the movable guide 18 to move rectilinearly in this manner, excessive loosening and tightening of the wire material 16 are prevented, and the wire material 16 is held in the state of maintaining an appropriate tension. As a result, problems such as fluttering, entanglement, or disconnection of the wire material 16 are effectively suppressed. In addition, according to this wiring mechanism, a member having a large-diameter and a large-length as those of Cableveyor is not required, and thus a wiring space for the wire material 16 can be reduced and noise can also be kept small. Furthermore, according to the wiring structure 10 disclosed in the specification, the motion of the movable guide 18 is a very simple motion referred to as the rectilinear movement in conjunction with the movable member 12. Therefore, the movement of the movable guide 18 can be easily controlled.

Figure 2:
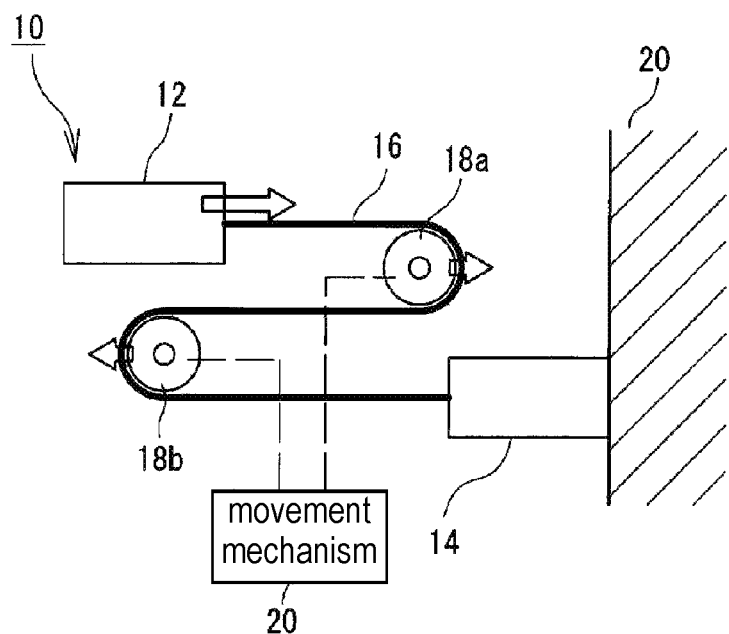
FIG. 2 is a schematic diagram showing an example of another wiring structure.

Next, a modification example of the wiring structure 10 is described. As described above, the number, the position, or the size of the movable guide 18 arranged in the wiring structure 10 may be appropriately changed. For example, a plurality of movable guide 18 may be arranged. Accordingly, as shown in FIG. 2, two movable guides 18, that is, a first movable guide 18a and a second movable guide 18b may be arranged, and the wire material 16 extending from the movable member 12 may make a U-turn of 180 degrees in each of the first movable guide 18a and the second movable guide 18b. In this case, when the movement amount of the movable member 12 is set as L, the movement amount I of each movable guide 18 is I=L/4.

In addition, in this case, the first movable guide 18a moves in the same direction as the movable member 12, and the second movable guide 18b moves in the opposite direction of the movable member 12. From another perspective, when the movable member 12 moves in the direction (right direction) in which the wire material 16 is loosened, the movable guides 18a and 18b move in the direction in which the stretched wire material 16 is tightened; when the movable member 12 moves in the direction (left direction) in which the wire material 16 is tightened, the movable guides 18a and 18b move in the direction in which the stretched wire material 16 is loosened. Even when a plurality of movable guides 18a and 18b is arranged in this manner, each of the movable guides 18a and 18b moves in the direction in which the loosening or tightening of the wire material 16 caused by the rectilinear movement of the movable member 12 is offset, and thereby the loosening or disconnection of the wire material 16 can be prevented. In addition, when there is a plurality of movable guides 18a and 18b, the movement amount I of each of the movable guides 18a and 18b can be reduced, and thus the wiring structure can also be applied to the case in which it is difficult to secure the movement space for the movable guides 18a and 18b.

Figure 3:
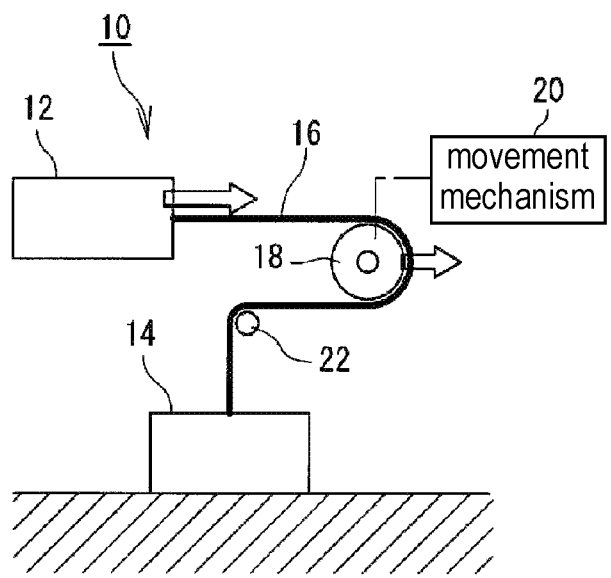
FIG. 3 is a schematic diagram showing an example of another wiring structure.

In addition, in another embodiment, as shown in FIG. 3, in addition to the movable guide 18, a fixed guide 22 having a fixed position may be arranged in the middle of the path of the wire material 16. Similar to the movable guide 18, the fixed guide 22 is a member over which the wire material 16 is stretched, but different from the movable guide 18, the fixed guide 22 is invariable at a predetermined position. Then, the path of the wire material 16 is bent by stretching the wire material 16 over the fixed guide 22. With this configuration, the degree of freedom in the path design of the wire material 16 is improved, and the applicable range of the wiring structure 10 can be expanded.

Figure 4:
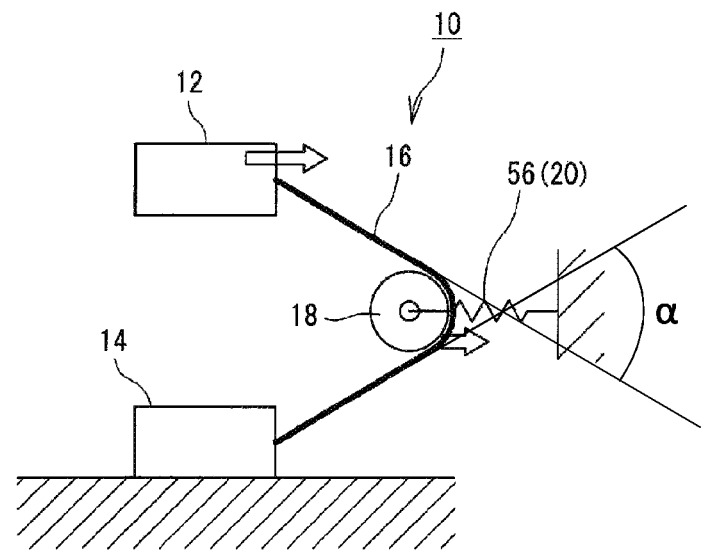
FIG. 4 is a schematic diagram showing an example of another wiring structure.

In addition, in the above description, only the configuration in which the wire material 16 makes a U-turn of 180 degrees in the movable guide 18 is described, but a U-turn angle α of the wire material 16 in the movable guide 18 may be changed appropriately. For example, as shown in FIG. 4, the U-turn angle α of the wire material 16 in the movable guide 18 may not be 180 degrees. Even in this case, when the movable member 12 moves in the direction (right direction) in which the wire material 16 is loosened, the movement mechanism 20 causes the movable guide 18 to move in the direction (right direction) in which the wire material 16 is tightened; when the movable member 12 moves in the direction (left direction) in which the wire material 16 is tightened, the movement mechanism 20 causes the movable guide 18 to move in the direction (left direction in the illustrated example) in which the wire material 16 is loosened.

However, when the U-turn angle α is not 180 degrees, the value of the movement amount I of the movable guide 18 with respect to the movement amount L of the movable member 12 changes at any time. Therefore, it becomes difficult to specify the movement amount I that can prevent the loosening or tightening of the wire material 16. Thus, when the U-turn angle is not 180 degrees, the movement mechanism 20 is desirably set as a pulling mechanism which pulls the movable guide 18 in the direction in which the wire material 16 is tightened.

For example, in the example of FIG. 4, the movement mechanism 20 desirably has a spring 56 that urges the movable guide 18 in the right direction. In this configuration, when the movable member 12 moves in the direction (left direction) in which the wire material 16 is loosened, due to the urging force of the spring 56, the movable guide 18 moves in the direction (right direction) in which the wire material 16 is tightened. In addition, when the movable member 12 moves in the direction (left direction) the wire material 16 is tightened, due to the tension generated in the wire material 16, the movable guide 18 moves in the direction (right direction) in which the wire material 16 is loosened against the urging force of the spring 56. Then, as a result, even if the U-turn angle is not 180 degrees, the loosening or tightening of the wire material 16 can be suppressed.

Next, a specific example of the movement mechanism 20 is described. As described above, the movement mechanism 20 is a mechanism that causes the movable guide 18 to move rectilinearly in conjunction with the movement of the movable member 12. The movement mechanism 20 may have, for example, a driving source that performs driving independently of the driving source (a motor, a hydraulic cylinder, or the like) that causes the movable member 12 to move rectilinearly.

Figure 5:
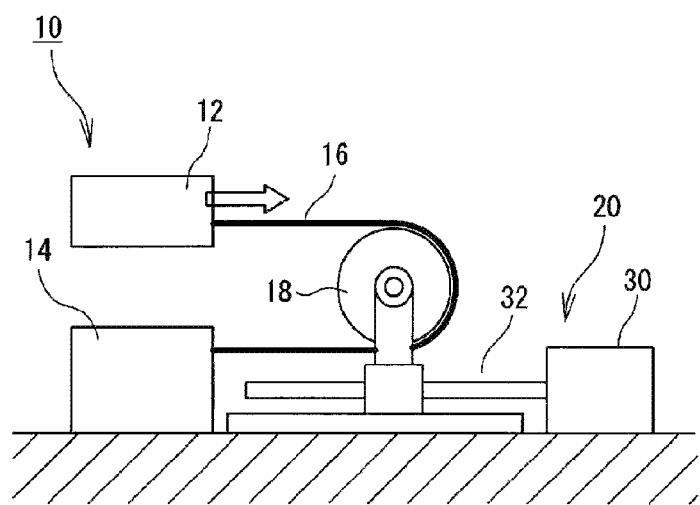
FIG. 5 is a schematic diagram showing an example of another wiring structure.

Specifically, as shown in FIG. 5, the movement mechanism 20 may include a driving motor 30 arranged independently of the motor (not shown) that causes the movable member 12 to move rectilinearly, and a transmission mechanism 32 that transmits the rotation of the motor 30 to the movable guide 18 as rectilinear motion. The transmission mechanism 32 may be, for example, a ball screw and the like.

Figure 6:
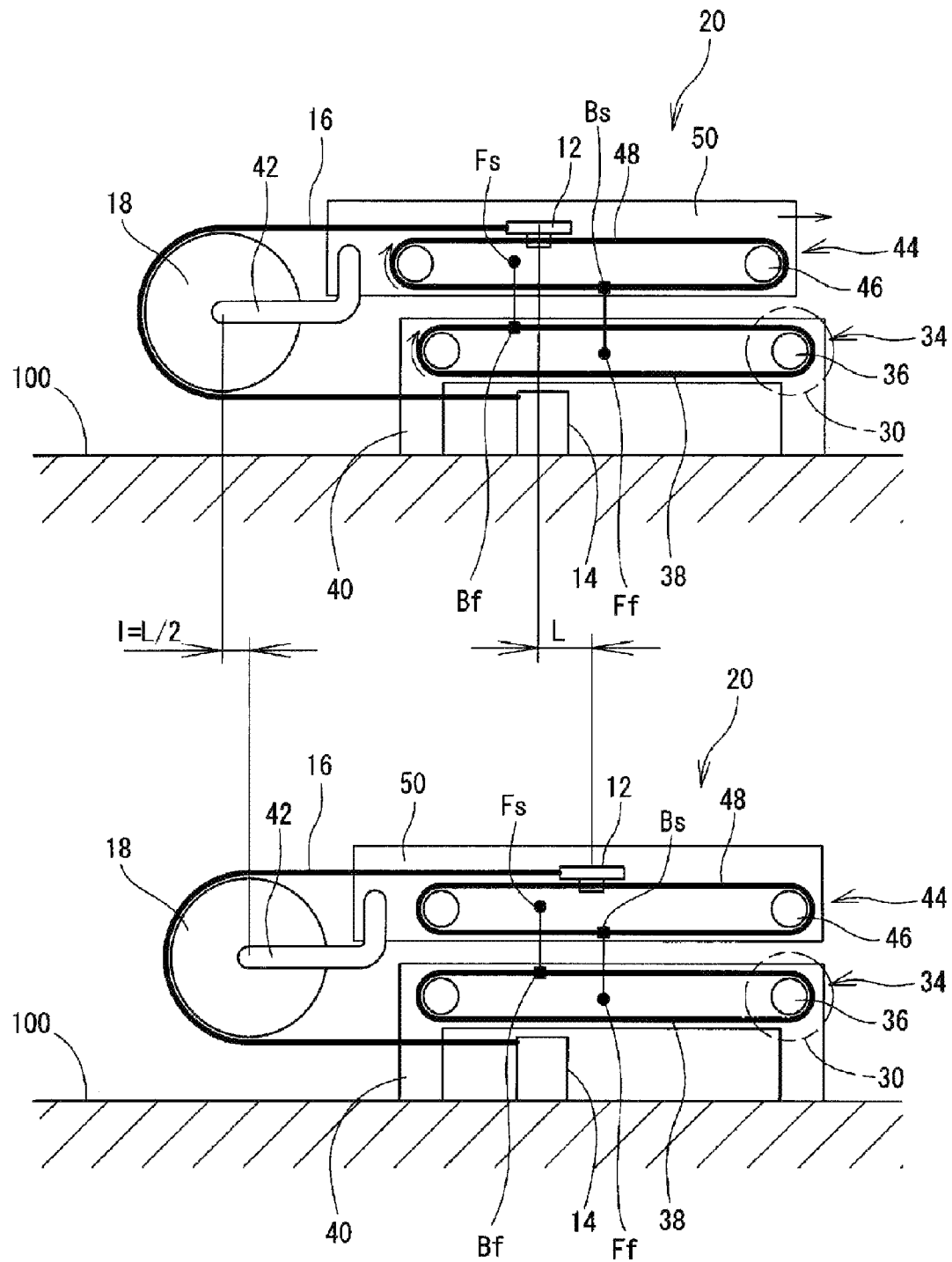
FIG. 6 is a schematic diagram showing an example of another wiring structure.

In addition, as another embodiment, the movement mechanism 20 may be a mechanism that causes the movable guide 18 to move rectilinearly with the same motor as the motor that causes the movable member 12 to move rectilinearly. FIG. 6 shows an example of the movement mechanism 20 that causes both the movable member 12 and the movable guide 18 to move rectilinearly with one motor 30.

In the example of FIG. 6, the movement mechanism 20 has two belt units, that is, a first belt unit 34 and a second belt unit 44. The first belt unit 34 has a first roller pair 36 and a first endless belt 38 stretched over the first roller pair 36. The motor 30 is connected to the first roller pair 36, and the first roller pair 36 and the first endless belt 38 rotate when the motor 30 is driven.

The second belt unit 44 has a second roller pair 46 and a second endless belt 48 stretched over the second roller pair 46. The second belt unit 44 is arranged in parallel with the first belt unit 34. The movable member 12 is attached to the second endless belt 48, and the second endless belt 48 moves and thereby the movable member 12 moves rectilinearly.

The first belt unit 34 is attached to a first frame 40, and the second belt unit 44 is attached to a second frame 50. The first frame 40 is fixed to a base surface 100, and the position of the first frame 40 is invariable.

On the other hand, the second frame 50 is capable of moving rectilinearly with respect to the first frame 40, and the second frame 50 moves rectilinearly and thereby the absolute position of the movable member 12 also moves rectilinearly. In addition, the movable guide 18 is connected to the second frame 50 via a connection member 42. Accordingly, when the second frame 50 moves rectilinearly, both the movable guide 18 and the movable member 12 move rectilinearly.

Furthermore, a point Ff on the first frame 40 is connected to a point Bs on the second endless belt 48, and a point Fs on the second frame 50 is connected to a point Bf on the first endless belt 38. Besides, the point Bs on the second endless belt 48 is located on the opposite side of the attachment position of the movable member 12 with the second roller pair 46 located therebetween, and the movable member 12 moves in the direction opposite to the point Bs when the second endless belt 48 rotates.

The operation of the aforementioned movement mechanism 20 is described. First, a case in which the first roller pair 36 is rotated clockwise by the motor 30 is considered. In this case, the first endless belt 38 also rotates clockwise, and the point Bf on the first endless belt 38 moves in the right direction. The movement amount at this time is set as I. The point Bf moves, and thereby the second frame 50 connected to the point Bf also moves in the right direction by the distance I. Here, since the second belt unit 44 and the movable guide 18 are also connected to the second frame 50, the second belt unit 44 (the movable member 12) and the movable guide 18 also move in the right direction by the distance I along with the movement of the second frame 50.

If the second frame 50 moves in the right direction by the distance I, the point Bs on the second endless belt 48 also attempts to move in the right direction by the distance I. However, the absolute position of the point Bs cannot be changed due to the connection relationship with the first frame 40. Therefore, when the second frame 50 moves in the right direction by the distance I, the second endless belt 48 rotates clockwise by the distance I so as to offset the change in the absolute position of the point Bs accompanied by the movement of the second frame 50. Thereby, the absolute position of the point Bs is invariable, and the connection relationship with the first frame 40 is maintained.

Then, in order to keep the absolute position of the point Bs invariable, if the second endless belt 48 rotates clockwise by the distance I, the movable member 12 attached to the second endless belt 48 also moves in the right direction by the distance I. In other words, the absolute position of the movable member 12 changes according to the movement of the second frame 50 and the movement (rotation) of the second endless belt 48, and as a result, the movement amount L of the movable member 12 becomes twice the movement distance I of the movable guide 18, in other words, $L=2\times I$.

When the movable member 12 is moved in the left direction, the first roller pair 36 is rotated counterclockwise by the motor 30. In this case, the endless belts 38 and 48 rotate counterclockwise, and the second frame 50 moves rectilinearly in the left direction. As a result, the movable member 12 moves rectilinearly in the left direction by the movement amount L, and the movable guide 18 moves rectilinearly in the left direction by the movement amount $I=L/2$.

In other words, according to the movement mechanism 20 shown in FIG. 6, both the movable member 12 and the movable guide 18 can be moved rectilinearly by one motor 30. At this time, the movement distance I of the movable guide 18 is one half of the movement amount L of the movable member 12, and thus the loosening and tightening of the wire material 16 caused by the rectilinear movement of the movable member 12 can be offset. In addition, in the case of the movement mechanism 20 shown in FIG. 6, the movable member 12 and the movable guide 18 are mechanically connected, and thus the movable member 12 and the movable guide 18 can be moved rectilinearly in reliable conjunction even if a sensor or the like for synchronization control is not arranged.

In addition, as another embodiment, the movement mechanism 20 may have a follower mechanism that causes the movable guide 18 to follow the movable member 12 or another movable guide 18. For example, the movement mechanism 20 may have a gear that decelerates the motion of the movable member 12 and transmits the decelerated motion to the movable guide 18, or the like.

Figure 7:
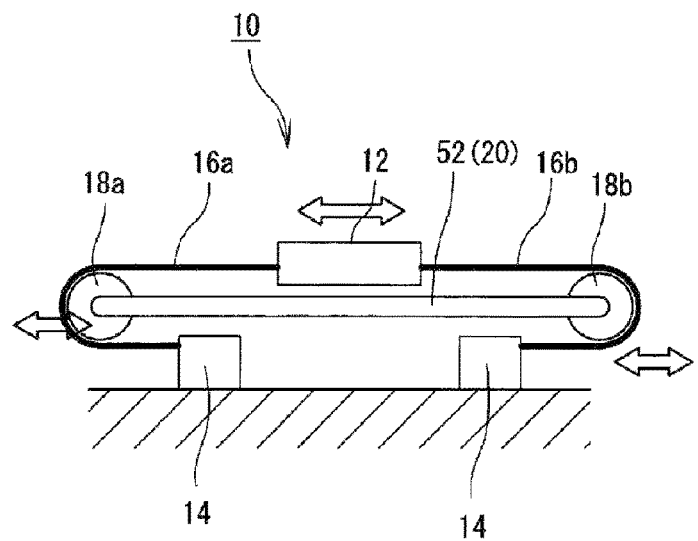
FIG. 7 is a schematic diagram showing an example of another wiring structure.

In addition, as another embodiment, as shown in FIG. 7, when the wiring structure 10 has a pair of movable guides 18a and 18b with an invariable interval, the movement mechanism 20 may include a restraint member 52 that restrains the distance (interval) between the pair of movable guides 18a and 18b. In the example of FIG. 7, a first wire material 16a is drawn out from one end (left end) of one movable member 12, and a second wire material 16b is drawn out from the other end (right end) of the movable member 12. The first wire material 16a is stretched over the first movable guide 18a, and the second wire material 16b is stretched over the second movable guide 18b, and each of the first wire material 16a and the second wire material 16b makes a U-turn of 180 degrees.

In this case, in order to prevent the loosening or tightening of the wire materials 16a and 16b, when the movable member 12 moves by the movement amount L, the first movable guide 18a and the second movable guide 18b may also move in the same direction as the movable member 12 by the movement amount I=L/2. In other words, the movement directions and the movement amounts of the first movable guide 18a and the second movable guide 18b for preventing the loosening or tightening of the wire materials 16a and 16b are always the same, and the interval between the first movable guide 18a and the second movable guide 18b is always the same.

The restraint member 52 is a member restraining the interval between the first movable guide 18a and the second movable guide 18b to a fixed value, and is, for example, a bar in which one end is attached to the first movable guide 18a and the other end is attached to the second movable guide 18b. If the restraint member 52 is arranged, the movement of the first movable guide 18a and the second movable guide 18b in conjunction with the movement of the movable member 12 is automatically achieved.

That is, when the movable member 12 moves in the right direction and pulls the first wire material 16a toward the right direction, the first movable guide 18a moves in the right direction due to the tension generated in the first wire material 16a. When the first movable guide 18a moves in the right direction, the motion is transmitted to the second movable guide 18b via the restraint member 52, and the second movable guide 18b also moves in the right direction. When the movable member 12 moves in the left direction, on the contrary, the second movable guide 18b moves in the left direction due to the tension of the second wire material 16b, and the motion of the second movable guide 18b is transmitted to the first movable guide 18a via the restraint member 52.

In other words, in the illustrated example of FIG. 7, by arranging the restraint member 52, one of the two movable guides 18a and 18b can follow the movement of another. As a result, it is not necessary to arrange a dedicated driving source for the movement of the movable guides 18a and 18b, and the movable guides 18a and 18b can be moved appropriately.

Figure 8:
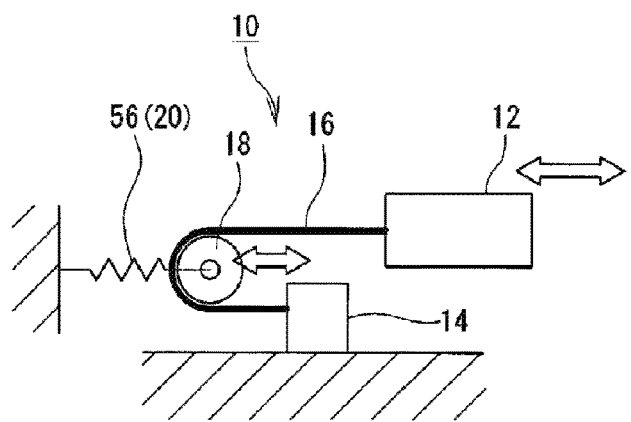
FIG. 8 is a schematic diagram showing an example of another wiring structure.

In addition, as another embodiment, the movement mechanism 20 may include a pulling mechanism which pulls the movable guide 18 in the direction in which the wire material 16 is tightened. For example, as shown in FIG. 8, the movement mechanism 20 may include the spring 56 that urges the movable guide 18 in the direction for tightening. In this case, if the movable member 12 moves in the direction (left direction) in which the wire material 16 is loosened, due to the urging force of the spring 56, the movable guide 18 automatically moves in the direction (left direction) in which the loosening of the wire material 16 is eliminated. In addition, if the movable member 12 moves in the direction (right direction) in which the wire material 16 is tightened and the wire material 16 is pulled to the right direction, due to the tension of the wire material 16, the movable guide 18 moves in the right direction against the urging force of the spring 56. In other words, by arranging the spring 56, the wire material 16 can be appropriately held even if a drive or the like dedicated to the movable guide 18 is not arranged.

Figure 9:
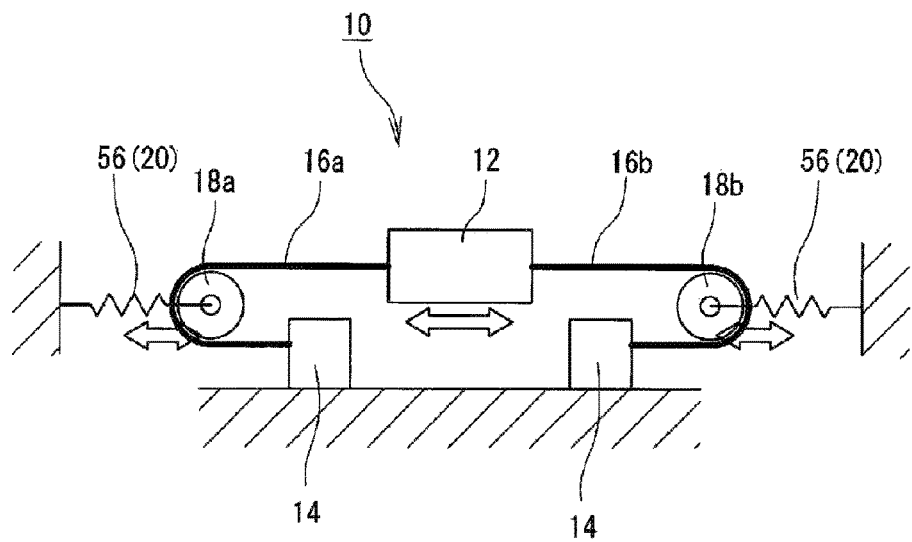
FIG. 9 is a schematic diagram showing an example of another wiring structure.

However, as shown in FIG. 8, when the spring 56 is arranged on only one side of the movable member 12, a preload corresponding to the urging force of the spring 56 is applied to the movable member 12. Thus, when it is desired to reduce the preload applied to the movable member 12, as shown in FIG. 9, the movable guide 18 and the spring 56 that urges the movable guide 18 may be arranged on both sides of the movable member 12. With this configuration, it is possible to appropriately hold the wire material 16 while reducing the preload applied to the movable member 12.

Figure 10:
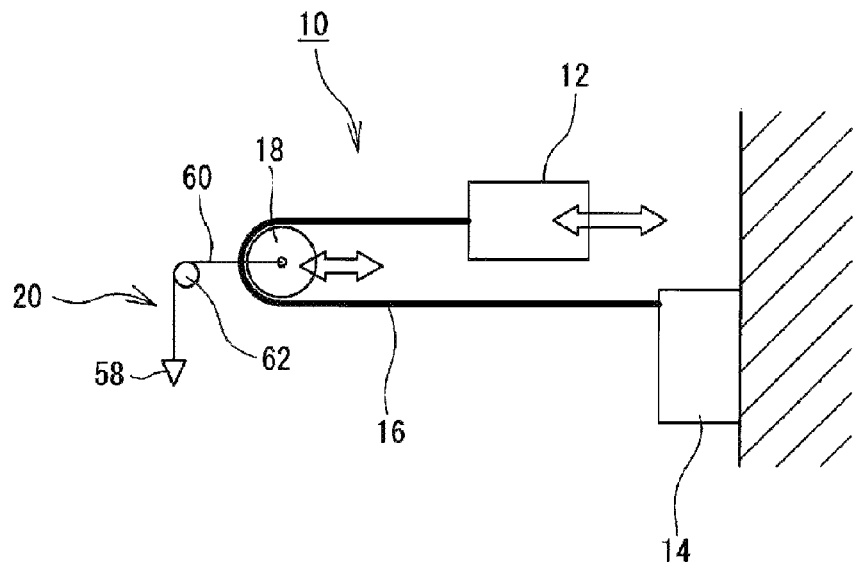
FIG. 10 is a schematic diagram showing an example of another wiring structure.

In addition, as another embodiment, as shown in FIG. 10, the movement mechanism 20 may have a weight 58 which is connected to the movable guide 18 and which pulls, by falling under gravity, the movable guide 18 in a direction in which the wire material 16 is tightened. In the example illustrated in FIG. 10, the angle at which the wire material 16 enters or leaves the movable guide 18 is horizontal, and the movable guide 18 is movable in the horizontal direction. A wire 60 is connected to the movable guide 18, and the wire 60 is stretched and bent over a pin 62 and extends vertically downward after extending in the horizontal direction. Then, the weight 58 is arranged at the front end of the wire 60, and the movable guide 18 is pulled leftward in the horizontal direction due to gravity acting on the weight 58.

In the case of this configuration, similar to the case of FIG. 8, if the movable member 12 moves in the direction (left direction) in which the wire material 16 is loosened, the movable guide 18 automatically moves due to gravity in the direction (left direction) in which the loosening of the wire material 16 is eliminated. In addition, if the movable member 12 moves in the direction (right direction) in which the wire material 16 is tightened, and the wire material 16 is pulled, the movable guide 18 moves in the right direction against the gravity due to the tension of the wire material 16. In other words, by arranging the weight 58, the wire material 16 can be appropriately held even if a motor or the like dedicated to the movable guide 18 is not arranged. Besides, in the example illustrated in FIG. 10, the weight 58 is arranged separately from the movable guide 18, but the movable guide 18 may be used as the weight 58 when the movable guide 18 moves in the vertical direction.

Figure 11:
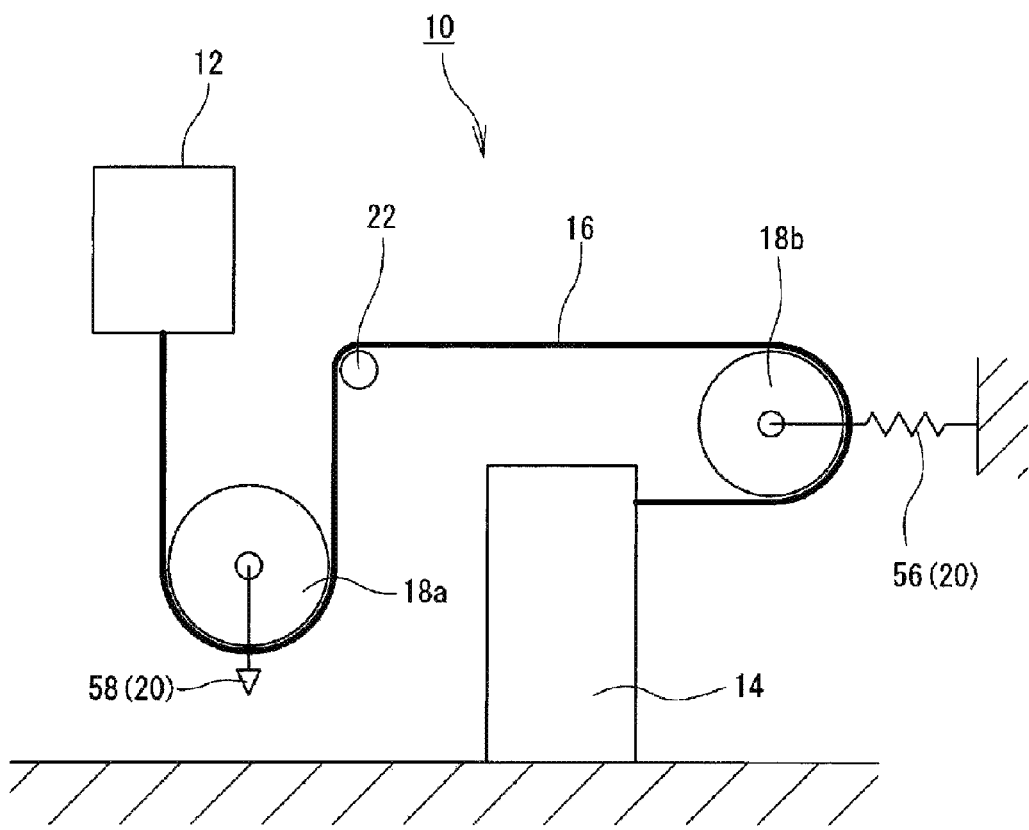
FIG. 11 is a schematic diagram showing an example of another wiring structure.

In addition, the movement mechanism 20 described above may be appropriately combined. For example, as shown in FIG. 11, when the first movable guide 18a and the second movable guide 18b are arranged in the middle of the path of one wire material 16, the first movable guide 18a may be pulled by the weight 58 and the second movable guide 18b may be pulled by the spring 56 in the direction in which the wire material 16 is tightened. Furthermore, as another embodiment, the first movable guide 18a may move rectilinearly by a dedicated motor, and the motion of the movable member 12 may be decelerated and transmitted to the second movable guide 18b.

In any case, as described above, by arranging the movable guide 18 over which the wire material 16 is stretched and which moves rectilinearly in conjunction with the rectilinear movement of the movable member 12, the wire material 16 can be held in the state of maintaining an appropriate tension without using Cableveyor.

What is claimed is:
1. A wiring structure, comprising:
a fixed member;
a movable member which moves rectilinearly with respect to the fixed member;
a wire material which connects the movable member and the fixed member;
a movable guide over which the wire material is stretched and which is capable of moving rectilinearly with respect to the fixed member; and a movement mechanism which causes the movable guide to move, in conjunction with the rectilinear movement of the movable member, rectilinearly in a direction in which the loosening or tightening of the wire material caused by the rectilinear movement of the movable member, is offset.

2. The wiring structure according to claim 1, comprising
a first wire material extending from one end of the movable member, and a second wire material extending from the other end of the movable member;
a first movable guide over which the first wire material is stretched and a second movable guide over which the second wire material is stretched are arranged on both sides of the movable member; and
the movement mechanism has a restraint member which restrains the distance between the first movable guide and the second movable guide.

3. The wiring structure according to claim 1,
wherein the wire material comprises a first wire material extending from one end of the movable member, and a second wire material extending from the other end of the movable member;
a first movable guide over which the first wire material is stretched and a second movable guide over which the second wire material is stretched are arranged on both sides of the movable member; and
the movement mechanism has:
a first pulling mechanism which pulls the first movable guide in a direction in which the first wire material stretched over the first movable guide is tightened; and
a second pulling mechanism which pulls the second movable guide in a direction in which the second wire material stretched over the second movable guide is tightened.

4. The wiring structure according to claim 3,
wherein the pulling mechanism comprises an elastic body which urges the movable guide in the direction in which the wire material stretched over the movable guide is tightened.

5. The wiring structure according to claim 4,
wherein the pulling mechanism comprises a weight which is connected to the movable guide, and which pulls, by falling under gravity, the movable guide in the direction in which the wire material stretched over the movable guide is tightened.

6. The wiring structure according to claim 1,
wherein the movement mechanism comprises:
a first belt unit having a first roller pair and a first endless belt stretched between the first roller pair;
a second belt unit having a second roller pair and a second endless belt stretched between the second roller pair;
a first frame to which the first belt unit is attached;
a second frame to which the second belt unit is attached and which is movable with respect to the first frame;
a first link which connects the first frame and the second endless belt; and
a second link which connects the second frame and the first endless belt;
the movable member is attached to a surface of the second endless belt, the surface being on the opposite side of a connection point, at which the second link is connected, with the second roller pair located therebetween; and
the movable guide is attached to the second frame and moves rectilinearly with the second frame.

7. A wiring structure, comprising:
a wire material;
a fixed unit which has a first belt, a fixed member holding one end of the wire material, and an immobility first non-movable portion;
a movable unit which has a second belt being connected to the first non-movable portion, a movable member holding the other end of the wire material with being fixed to the second belt, and a second non-movable portion being connected to the first belt; and
a movable guide over which the wire material is stretched and which moves rectilinearly with respect to the fixed member by one half of the movement amount of the movable member to offset the loosening or tightening of the wire material caused by the rectilinear movement of the movable member.

* * * * *